(12) United States Patent
Van Der Plas

(10) Patent No.: US 6,505,786 B2
(45) Date of Patent: Jan. 14, 2003

(54) SILAGE CUTTER

(75) Inventor: Nicolaas Van Der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 0 days.

(21) Appl. No.: 09/739,551

(22) Filed: Dec. 15, 2000

(65) Prior Publication Data

US 2002/0007621 A1 Jan. 24, 2002

(30) Foreign Application Priority Data

Jun. 23, 2000 (EP) ............................................. 00113389

(51) Int. Cl.[7] ............................................... B02C 19/12
(52) U.S. Cl. .............................. 241/101.763; 241/101.8
(58) Field of Search ..................... 241/101.76, 101.762, 241/101.763, 605, 33, 36, 101.8

(56) References Cited

FOREIGN PATENT DOCUMENTS

| DE | 297 19 753 | 2/1998 |
|---|---|---|
| EP | 0 359 482 | 3/1990 |
| EP | 0 506 158 | 9/1992 |
| EP | 0 779 027 | 6/1997 |
| FR | 2 634 620 | 2/1990 |
| FR | 2 759 536 | 8/1998 |
| WO | WO 95/20869 | 8/1995 |

*Primary Examiner*—Mark Rosenbaum
(74) *Attorney, Agent, or Firm*—Flynn, Thiel, Boutell & Tanis, P.C.

(57) ABSTRACT

A silage cutter having a frame consisting of first and second frame members which are adapted to be moved relative to one another about a hinge axle by means of a drive mechanism, wherein the drive mechanism includes two hydraulic cylinders. The first frame member has a knife attached thereto. The second frame member has provided thereon gripping devices for gripping the silage. A hydraulic device causes the two cylinders to always have the same length.

27 Claims, 11 Drawing Sheets

SILAGE CUTTER

FIELD OF THE INVENTION

The present invention relates to a silage cutter having improved efficiency and reliability characteristics.

BACKGROUND OF THE INVENTION

In the device disclosed in European Patent No. EP 0 506 158 A, the distance between the cutter hinge axle and the part of the gripping devices which is most remote from the hinge axle corresponds to the distance between the hinge axle and the knife. The two cylinders, which are driven for bringing together first and second frame members for a silage cutting operation, are hydraulically controlled via a directional control valve in such a way that, if one cylinder is in advance, the application of pressure to the cylinder will be throttled or interrupted until both cylinders move in synchronism. For this purpose, sensors are provided on both sides of the first frame member, which are connected to the rerouting sides of the directional control valve. An adaptation of the cylinder movements is only effected after a preceding deviation in the movements of the two cylinders; this causes deformations or transverse displacements at the frame members which have to be eliminated afterwards. Further, this adaptation influences the cutting result and causes undesirable high loads in the device. Also, due to the dimensions of the distance, the knife will not neatly cooperate with the gripping devices towards the end of the cutting operation, but instead an undefined cutting condition will occur. The frame members of the disclosed device must be extremely robust, which entails further disadvantages. According to a further embodiment disclosed therein, at least one knife is provided which is adapted to be moved to and fro during the cutting operation and which carries out a sawing movement. However, this knife requires inexpedient dimensions transversely to the cutting direction.

Additional prior art is contained in DE 297 19 753 U, EP 0 779 027 A and in EP 359 482 A.

SUMMARY OF THE INVENTION

It is the object of the present invention to provide a silage cutter of the type disclosed above which includes a stationary knife that is forced through the silage and can nevertheless utilize a comparatively light frame. This object is achieved by the silage cutter disclosed and claimed herein.

Since it is guaranteed that the two frame members provided on the two sides of the device will approach each other at exactly the same speed and independently of the reaction force occurring, strong cutting forces can be produced by the present device without any disadvantageous deformation of the frame. Hence, stationary knives which are very flat and thin and which will easily cut through the silage can be used with the present device. Due to the relative distance defined between the pivot axle and the knife on the one hand and between the pivot axle and the most remote point of the gripping device on the other, a defined cutting condition is obtained at the end of the cutting operation. The defined cutting condition is also supported by the cylinders, which are configured to move exactly in synchronism.

When the cylinders of the present invention are connected in series, there will always be a fixed relation between the amount of pressure medium supplied to one cylinder and the amount of pressure medium supplied to the other cylinder. The diameter of one of the cylinders should be smaller than the diameter of the other cylinder so that the pressure medium which is displaced by the piston of one cylinder and which acts on the piston-rod side of the piston of the other cylinder produces identical speeds of the two cylinders.

When the cylinders are connected in parallel, hydraulic means guarantee that the cylinders move in synchronism; thus the cylinders can be dimensioned identically.

It will be expedient to provide hydraulic devices which limit the maximum pressure in each cylinder or the pressure difference between the two cylinders to a set value. This will additionally protect the frame against excessive deformation.

Advantageous kinematic conditions, which are important for high cutting forces and distortion-free cutting, are obtained when the distance between the hinge axle and the articulation point of the cylinders on the first frame member is larger than half the distance between the hinge axle and the knife. It will be expedient when this distance is even larger than two thirds, or even larger than three quarters of the distance between the hinge axle and the knife. The distance between the hinge axle and the articulation point of each cylinder on the first frame member corresponds almost precisely to the distance between the hinge axle and the knife, minus the desired silage cutting depth, i.e. the thickness of a slice of "silage" cut out by the knife.

Advantageous kinematic conditions will also be obtained on the second frame member if the distance between the hinge axle and the articulation point of the cylinders on the second frame member is larger then half the distance between the hinge axle and the gripping devices. This distance could even be larger than two thirds, and, if necessary, it could even be larger than three quarters of the distance between the hinge axle and the gripping devices.

The cutting quality will be improved when the first frame member has provided thereon at least one lateral knife which is fixedly attached to the frame member and which extends almost at right angles to the transversely extending main knife and is oriented almost radially to the hinge axle. In this instance, the knife and the two lateral knives are arranged such that they define a U-shape. The lateral knife may have a curved cutting surface.

The cutting edge of the knife and/or of each lateral knife may be straight or it may have a curved shape. Preferably, the cutting edge may have individual parts which extend at a certain angle relative to one another and which define e.g. a knurled or a wavy cutting edge. Good cutting results can be achieved by knives and lateral knives, respectively, in the case of which the distance between forwardly extending portions of the cutting edge is smaller than 8 cm, or even smaller than 6 cm, or, even better, smaller than 4 cm.

The knife may be a metal plate on which the cutting edge is defined by an edge-side bevel of the plate. The bevel should be located on the side facing away from the hinge axle so as to achieve a good cutting quality.

The second frame member is provided with one or with a plurality of cutting devices which are intended to cooperate with the knife and/or the lateral knives of the first frame member. When the cutting edge of each knife moves against or almost against one of these cutting devices at the end of the cutting operation, the silage will be cut neatly.

At one edge of the cutting device, the cutting edge of the knife or of the lateral knife will move in such a way that a scissorlike cutting movement or a drawing cut will be obtained. The cutting device may be provided with an immersion groove for the cutting edge of the knife and of the lateral knives, respectively; the cutting edges need not touch the bottom of the groove, since a good cut is already effected at the edges. The gripping devices define a kind of loading flap and have a platelike member provided with a sharp edge or teeth which is/are adapted to be pressed into the silage block. It will be expedient to implement the platelike member such that it does not have any openings so that the cut-out silage will drop on the platelike member for being then transferred in its entirety to a mixing chamber of the silage cutter.

When the differential distance mentioned at the beginning is at least 5 cm, or even better 15 cm, a substantial part of the gripping device will still be located in the uncut silage when the cutting operation has almost been finished. In addition, the knife and the later knives cooperate very effectively with the gripping devices.

Even if comparatively strong cutting forces are generated by the hydraulic cylinders, the guide mechanisms will assist in the formation of a neat cut because the frame members are guided along one another and will not move parallel to the hinge axle nor deform.

A stop of the guide mechanism permits an exact adjustment of the end of the movement of the knives. At the end of a cutting operation, the knives, as soon as the stop becomes effective, have carried out a movement corresponding to almost their whole effective length up to a point located very close to the cutting devices so that the whole silage located below the knife is neatly cut through.

Part of the mixing chamber used for depositing the cut-out silage is defined by the second frame member. It will be expedient when the second frame member is tiltably secured to the mixing chamber by means of a hinge so that the cut-out silage can be deposited in the mixing chamber by tilting the second frame member. The mixing chamber may have provided therein a mixing device and/or other devices for treating the silage.

Alternatively, the second frame member can be connected to the mixing chamber in a more or less stationary manner and define the bottom of the mixing chamber, whereas the first frame member is equipped with a loading flap which is pivotable on arms, the knife being secured to the edge of the loading flap. For connecting the loading flap to the first frame member, a hinge or a sliding mechanism can be used. The second frame member can define an approximately flat extension of the bottom of the mixing chamber on which the cut-out silage is deposited.

When traveling, the silage cutter is supported by ground support wheels. The silage cutter can be adjusted approximately vertically relative to the wheels by means of a suitable adjustment device. In this way, it is possible to lower the gripping devices until they touch the ground and to push them along the ground up to and below the silage to be cut out. Losses will be avoided in this way. For transporting the cut-out silage, the silage cutter can be raised on the wheels so as to be easily movable.

Making use of the fact that the second frame member is pivotable on said mixing chamber with the aid of two hydraulic cylinders, if the cut-out silage is transferred to the mixing chamber, control valves, e.g. check valves, should be provided in pressure medium supply conduits of these cylinders so that the length of the two cylinders and, consequently, the respective pivotal position of the second frame member can be fixed in relation to the mixing chamber, at least temporarily.

A precise synchronous movement of the two cylinders, which have to produce the cutting forces and which are connected in parallel, is achieved by means of a hydraulic flow divider configured to supply identical pressure medium flows to the two cylinders, irrespective of the extent to which the counter forces at the two cylinders may perhaps differ from one another. In comparison with a directional control valve which is only actuated in response to a deviation from a condition of synchronous movement so as to eliminate said deviation, the flow divider has the advantage that there will be no deviation from a synchronous movement because, if the counter pressure at one cylinder increases, the flow divider will supply this cylinder, irrespective of the increasing counter pressure, with the same amount of pressure medium as the other cylinder so that a relative advance will be excluded.

To prevent the silage cutter from being damaged, if an obstacle would become effective on one side of the silage cutter, or some other obstruction should occur, pressure-limiting valves are provided which limit the maximum pressure in each cylinder and/or the maximum differential pressure between the cylinders and which will therefore respond automatically to an emergency situation.

Also, if the cylinders are connected in series, both cylinders should be supervised by pilot-controlled pressure-limit valves defining equalizing valves so as to reduce excessive pressure and avoid damage in the event of an emergency situation.

It is part of the present invention that a silage cutter is controlled in such a way that a stationary knife on the first frame member is forced through the silage until said silage is finally cut through completely against gripping devices of the second frame member. The cutting forces are produced by two spaced cylinders which are controlled such that they always have the same length, whereby a distortion of the frame of the silage cutter or deformations is avoided. For this purpose, the two cylinders are hydraulically controlled in such a way that, irrespective of their individual counter pressure, they will be moved at the same speed and will always correspond in length to one another.

Since in cases where the cylinders are connected in parallel and pressure medium flows are apportioned to the cylinders via the flow divider, a 100% distribution cannot be guaranteed due to production-dependent and function-dependent tolerances, especially in the case of cylinder strokes of up to 200 mm and more, it may be expedient to associate, during silage cutting, a downstream compensating control valve with the flow divider, the compensating control valve throttling, if necessary up to complete blockage, the flow to the respective cylinder operating against the lower counter pressure on the supply side. This permits, at least during silage cutting, a largely ideal synchronous movement.

Alternatively, the cylinder operating against the lower counter pressure during silage cutting can intentionally be biased or decelerated on its discharge side; this is achieved either via a brake valve adjusted by a differential-pressure compensating control valve and located in the blocking conduit of the respective cylinder that leads to the common discharge conduit, or by a compensating control valve which is directly connected to the discharge conduits, or by biased control valves which are arranged directly in the discharge conduits and which are controlled crosswise from the operating conduits. Interventions on the discharge sides of the cylinders have, in the case of synchronous operation control processes, the advantage that only small pressure medium volumes or comparatively low pressures have to be governed.

BRIEF DESCRIPTION OF THE DRAWINGS

Embodiments of the subject matter of the invention and, at the beginning, a conventional, known drive mechanism are explained, making reference to the drawings in which.

DETAILED DESCRIPTION

Figure 1:
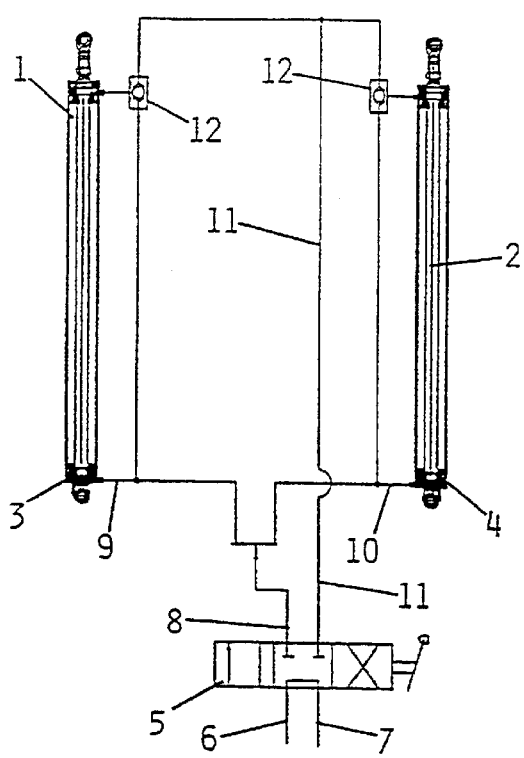
FIG. 1 shows a known hydraulic scheme of a silage cutter at the neutral position and after the execution of a cutting operation.

FIG. 1 shows two hydraulic cylinders 1 and 2 of a known hydraulic system which are arranged between two frame members of a silage cutter (not shown) so as to move these two frame members about a common hinge axle. The two cylinders 1 and 2 are shown at their retracted position at the end of a cutting operation, at which the pistons 3 and 4 are completely retracted in the cylinders 1 and 2. For adjusting a ready-to-cut position, the piston rods of the pistons 3, 4 are extended; during the cutting operation, the piston rods are retracted until they have reached the position shown. The cylinders 1 and 2 are actuated by the control valve 5 which, in the embodiment shown, is a 4/3-way control valve between a supply conduit 6 and a discharge conduit 7 on the one hand and operating conduits 8, 11 on the other. The operating conduit 8 branches and defines conduits 9 and 10 which lead to piston-side chambers of the cylinders 1, 2, a branch conduit leads from each of the conduits 9, 10 to the other operating conduit 11 via a shuttle valve 12. Connection conduits lead from shuttle valves 12 to the piston-rod-side chambers of the cylinders 1, 2.

When the control valve 5 is moved to the right, the supply conduit 6 is connected via the operating conduit 8 and the conduits 9, 10 to the piston-side cylinder spaces below the pistons 3, 4. The pistons 3, 4 are thus displaced upwards. The shuttle valves 12 are forced into their upper position so the pressure medium expelled by the pistons 3, 4 is forced downwards into the conduits 9, 10. The expelling movement of the piston rods is accelerated by the movement of the pressure medium. In this way, the first frame, which is not shown, will assume its ready-to-cut position more rapidly.

When the directional control valve 5 is subsequently moved to the left, the supply conduit 6 is connected to the operating conduit 11, whereas the operating conduit 8 is open towards the discharge conduit 7. The shuttle valves 12 are forced into their lower positions so the pressure medium is transferred to piston-rod-side chambers of the cylinders 1, 2 above the pistons 3, 4. This transfer of pressure medium causes the pistons 3, 4 to move downwards. The expelled pressure medium flows into the discharge conduit 7 via the conduits 9, 10 and the operating conduit 8. In the course of this process, silage is cut out. The shuttle valves 12 contain balls which, due to the higher pressure, are pressed onto a respective valve seat and which block the pressure medium in this direction of flow. Since the individual counterforce at one of the cylinders 1, 2 can be different from the counterforce at the other cylinders 1, 2 and since the pressure medium from the operating conduit 8 takes the way of least resistance, the cylinders 1, 2 acted upon by the higher load will lag behind, the whereas the cylinders 1, 2 acted upon by the lower load will move faster. This results in a distortion of the frame of the device or in an undesirable deformation. This disadvantage is overcome by an excessively stable structural design of the frame. The cutting quality may, however, deteriorate substantially, especially toward the end of a cutting operation.

Figure 2:
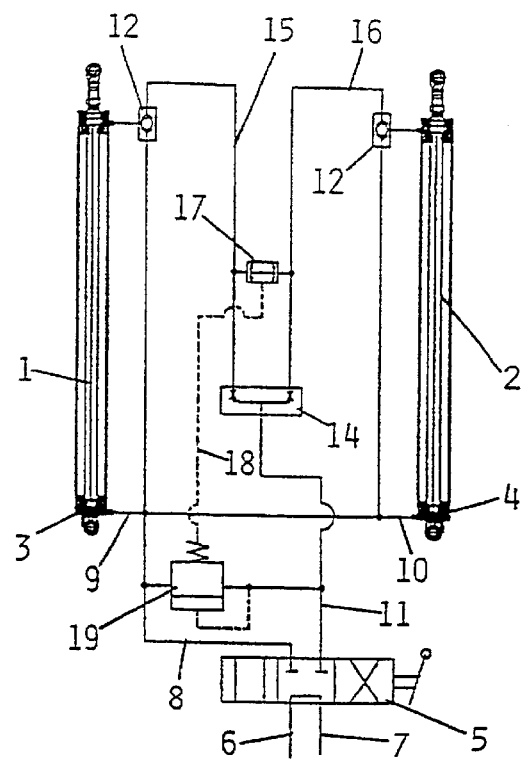
FIG. 2 shows a hydraulic scheme of a drive mechanism according to the present invention for a silage cutter.

FIG. 2 shows a hydraulic scheme for a silage cutter according to the present invention in which a difference in the lengths of the two cylinders 1, 2 during downward movement of the pistons 3, 4 is hydraulically avoided.

The directional control valve 5 is connected to the conduits 6, 7 and the operating conduits 8, 11 as in the known system described above. The FIG. 2 hydraulic scheme differs from the prior hydraulic scheme in that an equalizing valve 19 is provided between the operating conduits 8, 11 and is configured as a pressure-limiting valve which is pilot-controlled in the direction of flow from operating conduit 11 to operating conduit and which is spring-loaded in the closing direction. In addition, the equalizing valve 19 can be pressurized via a pilot conduit 18 by a pilot pressure in the closing sense. The two conduits branching off from the conduits 9, 10 and extending across from the shuttle valves 12 are not connected directly to the operating conduit 11, but are connected to two separate connections of a flow divider 14 via branch conduits 15, 16. The central connection of the flow divider 14 communicates with the operating conduit 11. In addition, a differential pressure valve 17 is provided between the branch conduits 15, 16, the differential pressure valve feeding the pilot conduit 18 at a central connection.

If the directional control valve 5 is moved to the left (cutting position), the supply conduit 6 is connected to the inlet of the flow divider 14 via the operating conduit 11. The flow divider apportions to the branch conduits 15, 16 identical pressure medium flows which pressurize the piston-rod-side chambers above the pistons 3, 4 of cylinders 1, 2 in the pressed-down condition of the shuttle valves 12. The identical pressure medium flows are apportioned irrespective of whether the reaction forces at the cylinders are identical or different. This means that the two pistons 3, 4 will move synchronously and that the two cylinders 1, 2 will always have the same length. A distortion of the frame or an inclined position of the knife of the silage cutter will be avoided in this way. If the individual resistance at one of the cylinders should become excessively high for some reason or other (risk of a detrimental deformation of the frame of the device), the differential pressure valve 17, which permanently compares the pressures in the two branch conduits 15, 16 will respond. In response to an adjustable value of the differential pressure between the two branch conduits 15, 16, a signal will be transmitted via the pilot conduit 18 to the equalizing valve 19, so that the equalizing valve will be set to a position allowing passage, whereby the operating conduit 11 will be opened towards the operating conduit 8 and, consequently, towards the discharge conduit 7. Pressure medium is discharged from the operating conduit 11 so that a predetermined pressure difference will not be exceeded. The pressure difference can be limited to a maximum of e.g. 50 bar.

Figure 3:
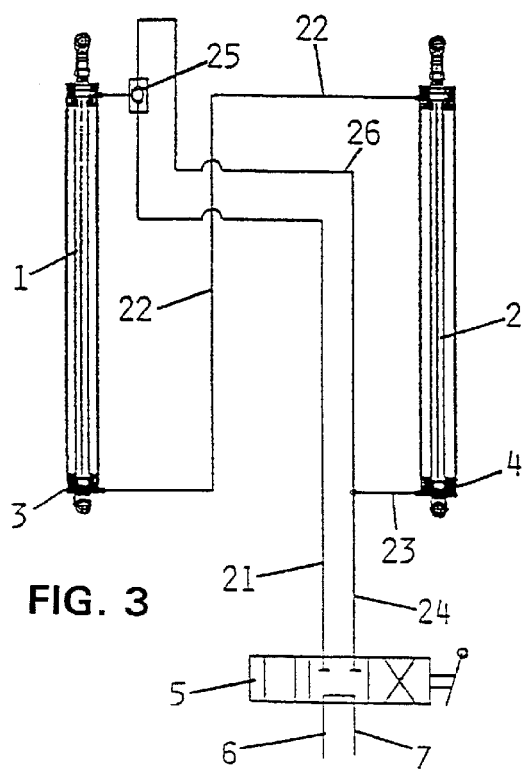
FIG. 3 shows another embodiment of a hydraulic scheme of a drive mechanism according to the present invention.

In FIG. 3, the two hydraulic cylinders 1, 2 are connected in series. This system is also referred to as "master and slave"; cylinder 1 is here the "master" whose movement during the retracting movement of piston 3 is automatically imitated by piston 4 in cylinder 2, the "slave". The directional control valve 5 supplies pressure medium from the supply conduit 6 to one of two operating conduits 21, 24 alternately, whereas the respective other operating conduit is connected to the discharge conduit 7. The operating conduit 21 leads to a shuttle valve 25, the piston-rod-side space above piston 3 of cylinder 1 being pressurized from the central connection of the shuttle valve 25. The piston-side space below piston 3 of cylinder 1 is connected via a conduit 22 to the piston-rod-side space of cylinder 2 above piston 4. The operating conduit 24 leads to the upper connection of the shuttle valve 25 and via a branch conduit 23 to the piston-side space below piston 4.

As soon as the shuttle valve 25 is moved to the right, the supply conduit 6 is connected to the operating conduit 26, whereas the operating conduit 24 is connected to the discharge conduit 7. The shuttle valve 25 is forced upwards so the piston-rod-side space above piston 3 of cylinder 1 will be pressurized by the pressure medium from the operating conduit 21. The pressure medium expelled by piston 3 is supplied via the conduit 22 to the piston-rod-side space above piston 4 of cylinder 2. The pressure medium expelled by piston 4 is conducted to the discharge conduit 7 via the branch conduit 23 and the operating conduit 24.

The cylinders 1 and 2 are differently dimensioned. The active cross-sectional surface of piston 3 in the piston-side chamber of cylinder 1 has the same size as the active cross-sectional surface in the piston-rod-side space of cylinder 12 above piston 4. The active application surface of piston 3 in the piston-rod-side space is smaller than the active cross-sectional surface in the piston-side space of cylinder 1. This has the effect that the two cylinders 1, 2 move at the same speed when the pistons 3, 4 are being retracted.

If the shuttle valve 5 is moved to the left, the supply conduit 6 is connected via the operating conduit 24 and the branch conduit 23 to the piston-side chamber below piston 4 of cylinder 2. The piston 4 is displaced upwards. The pressure medium expelled by piston 4 is conducted via the conduit 22 to a location below piston 3 of cylinder 1 so that the piston 3 will move upwards, with the movement of piston 3 taking place at the same speed as the movement of piston 4. When the directional control valve 5 has been moved to the left and when the pistons 3, 4 move upwards, the valve 25 (shuttle valve) will prevent pressure medium, which is discharged from cylinder 1, from flowing off through the conduit 21, the pressure medium, however, being discharged though the conduits 26 and 23 into cylinder, whereby a faster movement of the two cylinders 1, 2 will be obtained.

Figure 4:
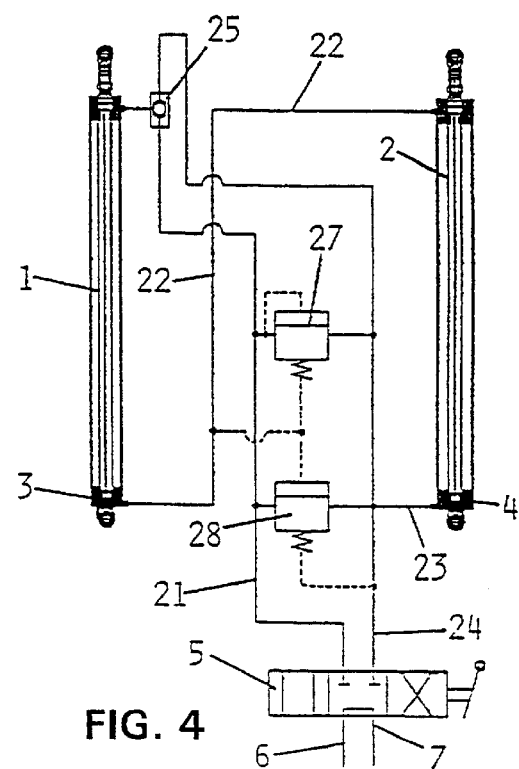
FIG. 4 shows a further embodiment of a hydraulic scheme of a drive mechanism according to the present invention.

In the embodiment shown in FIG. 4, the FIG. 3 embodiment is modified so that cylinders 1, 2 are differently dimensioned and two equalizing valves 27, 28 are provided. The equalizing valves are implemented as pressure-limiting valves which prevent the force exerted by each cylinder from becoming excessively strong. The two equalizing valves 27, 28 are adjusted to a maximum pressure of, for instance, 100 bar.

The equalizing valve 27 is pilot-controlled from the side of the operating conduit 21 in the direction of opening and is acted upon by a spring in the direction of closing. In addition, a pilot conduit is provided, which branches off from the conduit 22 and which is connected to the closing side of the equalizing valve 27. As soon as the pressure in the operating conduit 21 has reached the maximum pressure, 100 bar in the above example, the equalizing valve 27 will connect the operating conduit 21 to the operating conduit 24 and thus to the discharge conduit 7. The equalizing valve 28 is spring loaded in the closing direction and is also pressurized from the operating conduit 24 via a pilot conduit. The pilot conduit, indicated by a broken line in FIG. 4, branches off from the conduit 22 and acts on the equalizing valve 28 in the opening direction. As soon as the pressure on conduit 22 reaches an adjusted limit value (e.g. force of the spring at the equalizing valve 28), the equalizing valve 28 will open a flow connection through which pressure medium can flow off.

Figure 5:
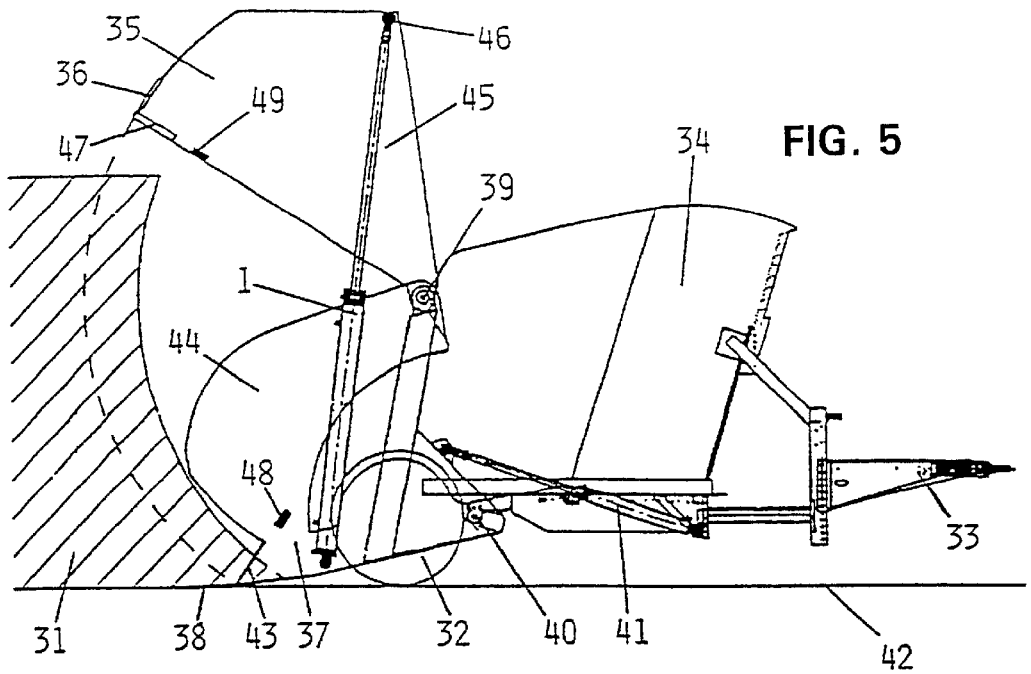
FIGS. 5–7 show a first embodiment of a silage cutter at a ready-to-cut position, at a position at the end of a cutting operation, and at a transport position.
Figure 6:
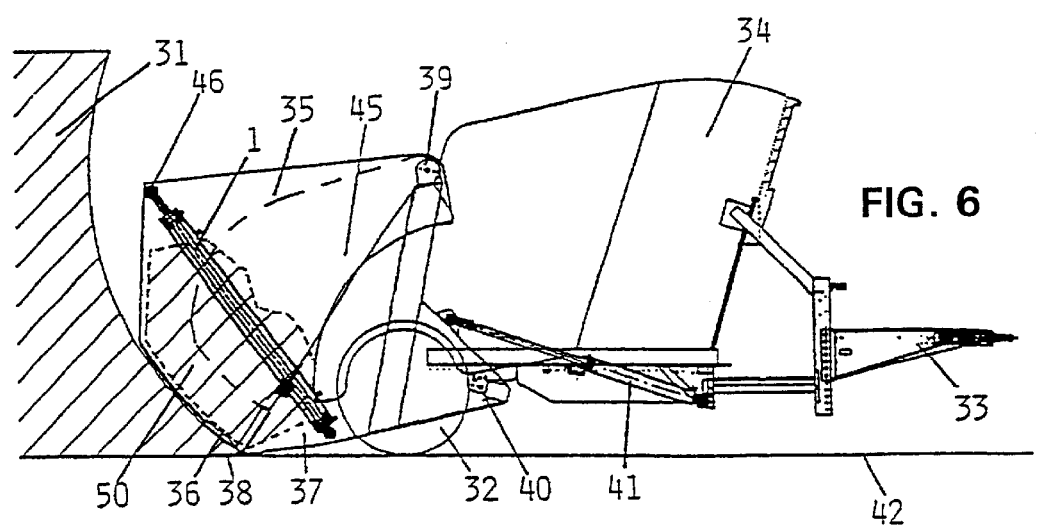
Figure 7:
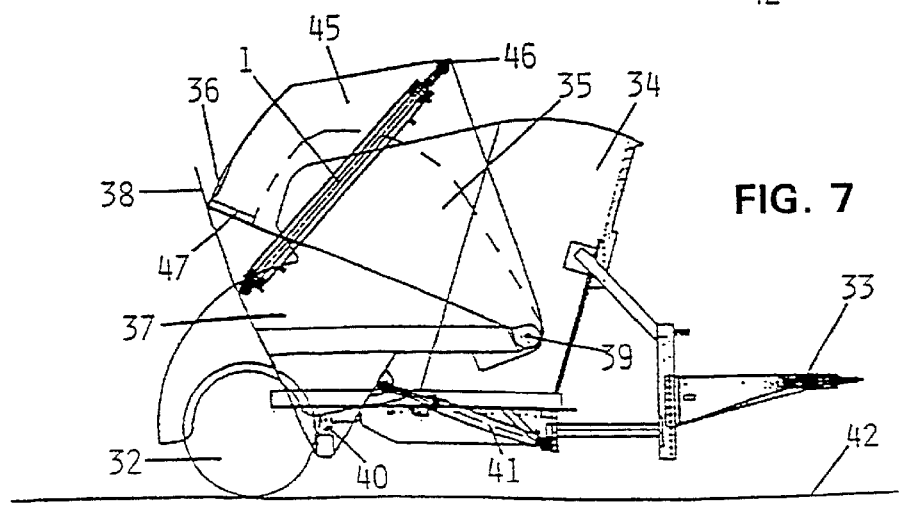

A silage cutter according to the present invention as disclosed in FIGS. 5 to 7 is movable on ground support wheels 32 and is adapted to be attached to a tractor by means of a pole 33. The silage has the form of a silage stock or silage block 31.

The device has provided therein a mixing chamber 34 for depositing cut-out silage for the purpose of transport. The mixing chamber 34 contains mixing devices by means of which the silage is loosened and mixed with other fodder components. The silage 31 is cut out with the aid of a frame comprising a first frame member 35 with a stationary knife 36 and a second frame member 37 provided with gripping devices 38 which engage the silage block when silage is being cut out. The first frame member 35 is pivotable about a hinge axle 39 on the second frame member 37. The second frame member 37 is connected via a hinge axle 40 to the part of the device containing the mixing chamber 34.

The first frame member 35 is adapted to be moved relative to the second frame member 37 by means of the cylinders 1, 2 (cylinder 2 is not visible). The second frame member 37, which has the first frame member 35 arranged thereon, can be adjusted relative to the mixing chamber 34 by means of additional hydraulic cylinders 41.

In FIG. 5, the device, which occupies a ready-to-cut position, is moved rearwards onto the silage block 31. By means of the cylinders 41, the second frame member 37 is piloted relative to the mixing chamber 34 downwards to such an extent that the gripping devices 38 touch the ground 42. The gripping devices 38, which can each take the form of a flat metal plate, have been pushed along the ground 42 below the silage block 31.

The first frame member 35 is now pivoted downwards about the hinge axle 39 by means of the cylinders 1, 2 so that the knife 36 is pressed through the silage along the broken line in FIG. 5 down to the position shown in FIG. 6. Subsequently, the second frame member 37 is pivoted together with the first frame member 35 about the hinge axle 40 by means of the cylinders 41 until the cut-out silage drops into the mixing chamber 34 (FIG. 7). In this embodiment, the second frame member 37 forms part of the wall of the mixing chamber 34.

The second frame member 37 consists of the platelike gripping devices 38 and of a flat part which follows the gripping devices 38 and on which the silage is deposited after having been cut out. The second frame member 37 is provided with side walls 44. The first frame member 35 consists of a U-shaped bent plate. The knife 36 is secured to the base of the U-shaped plate. The plate, which has been provided thereon articulation points 46 for the cylinders 1, 2 and by means of which the frame member 35 is connected to the second frame member 37 via the hinge axle 39, defines two side walls 45.

Each side wall 45 has a lateral knife 47 provided thereon which extends substantially at right angles to the knife 36. Both side walls 44 of the second frame member 37 are provided with a cutting device 43 towards which each lateral knife 47 moves when silage is being cut. A respective stop 48 serves to limit movement of the first frame member 35 relative to the second frame member 37. A guide mechanism 49 of the first frame member 35 strikes on the stop 48 as soon as the cutting operation is finished.

Figure 8:
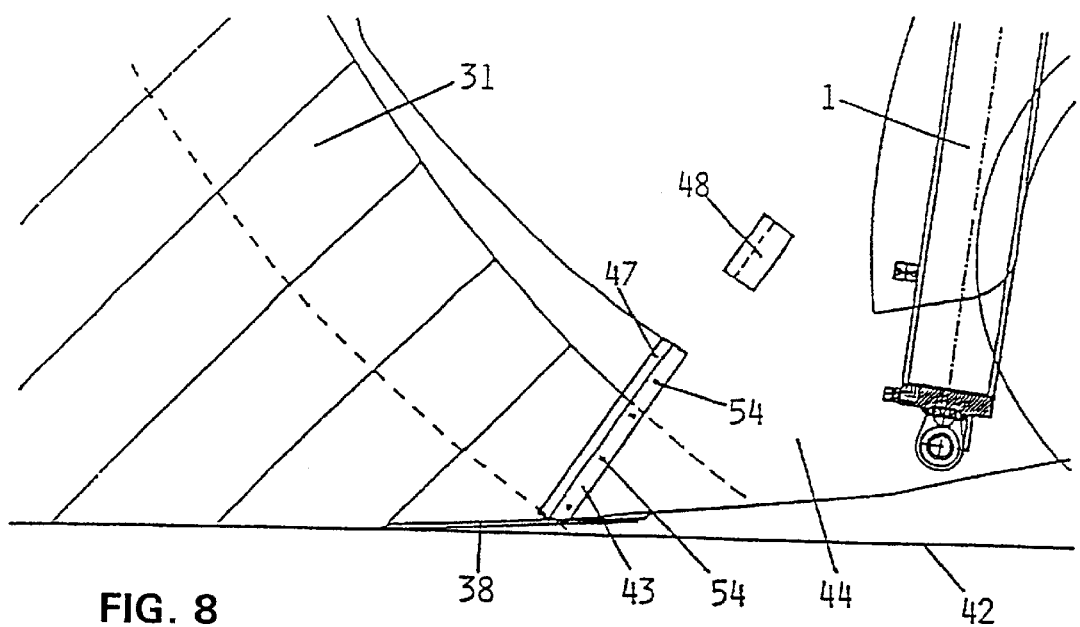
FIGS. 8–11 show enlarged representations of details of the embodiments of FIGS. 5 to 7, FIGS. 12–15 show a further embodiment of a silage cutter at a ready-to-cut position, at a position at the end of a cutting operation, at a transfer position for the cut-out silage, and at a transport position.
Figure 9:
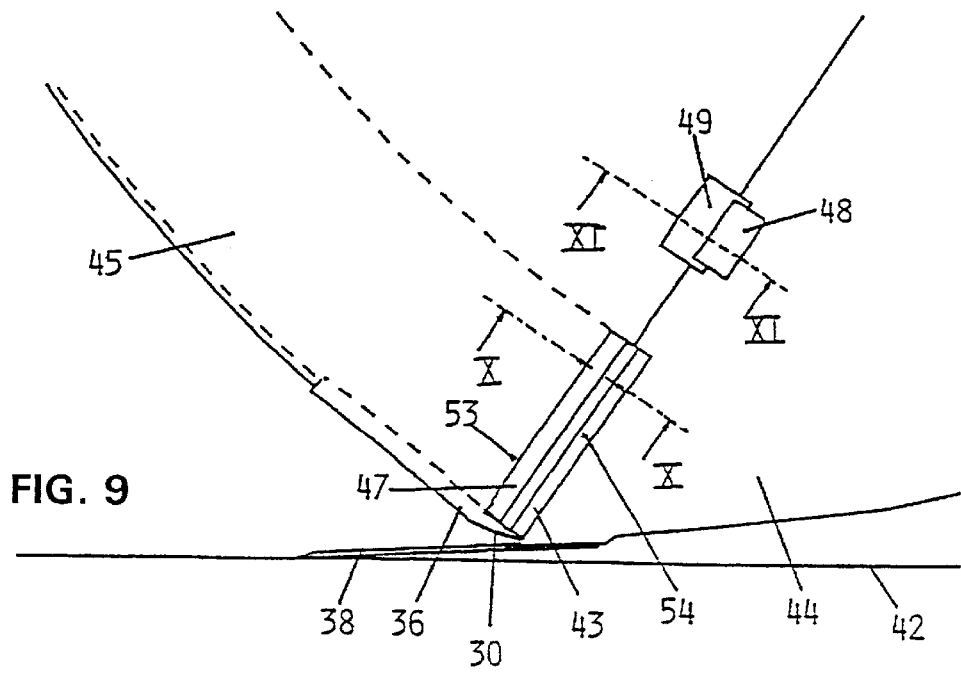

In FIG. 6, the cutting operation for a piece of silage 50 is complete. The cut piece of silage is deposited in the mixing chamber 34 by moving the frame member 35, 37 about the hinge axle 40 (FIG. 7). Conduits in which the pressure medium is supplied to and discharged from the cylinders 41 for pivoting the first and second frame members 35, 37 are provided with check valves which are adapted to be controlled and unblocked, respectively, so that the second frame member 37 can temporarily be fixed at a specific position relative to the mixing chamber 34. In FIGS. 8 and 9, the platelike gripping devices 38 extend up and below the silage block 31. The cutting device 43 on the side wall 44 of the second frame member 37 cooperates with the lateral knife 47 on the side wall 45 of the first frame member 35. Since the cutting edge of the lateral knife 47 is moved up to the cutting device 43, the silage located therebetween will be cut.

In FIG. 9, the platelike knife with its cutting edge can be seen, the cutting edge being defined by a bevel 30 on the side of the knife 36 facing away from hinge axle 39.

Figure 10:
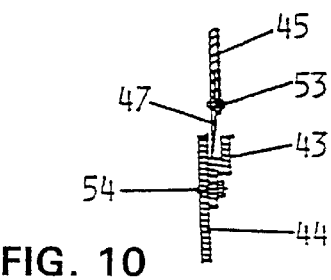

In FIG. 10, which illustrates a section view in the plane X—X of FIG. 9, it can be seen how the lateral knife 47 is secured to the side wall 45 by means of screws 53. At the end of the cutting operation, the lateral knife 47 is immersed in a groove provided between the cutting device 43 and the side wall 44. The cutting device 43 is secured to the side wall 44 by means of screws 54. With the aid of the groove, the silage can be cut through more effectively. If necessary, the cutting function in this area can be improved by configuring the cutting edge of the lateral knife 47 to cooperate with an edge of the groove so that the effect produced is approximately a scissorlike cutting function.

Figure 11:
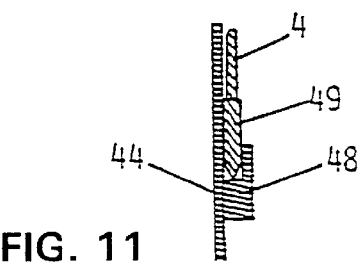
Figure 12:
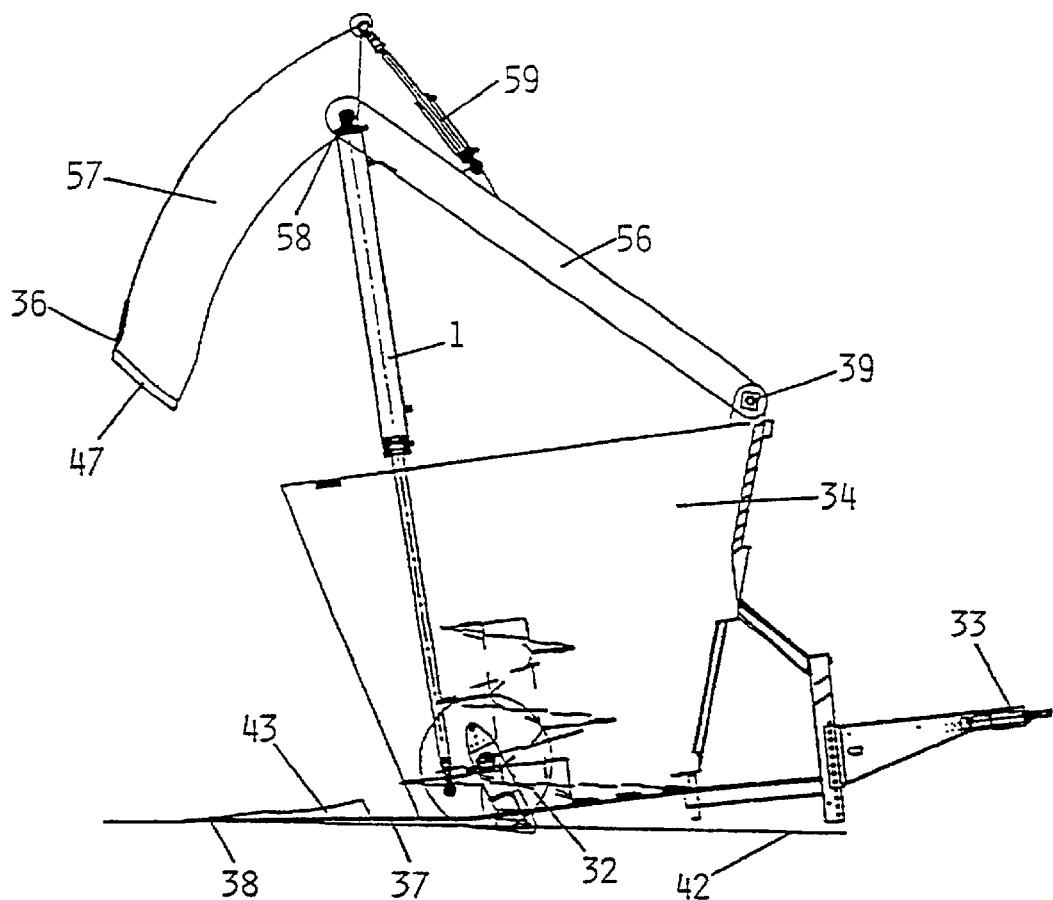
Figure 13:
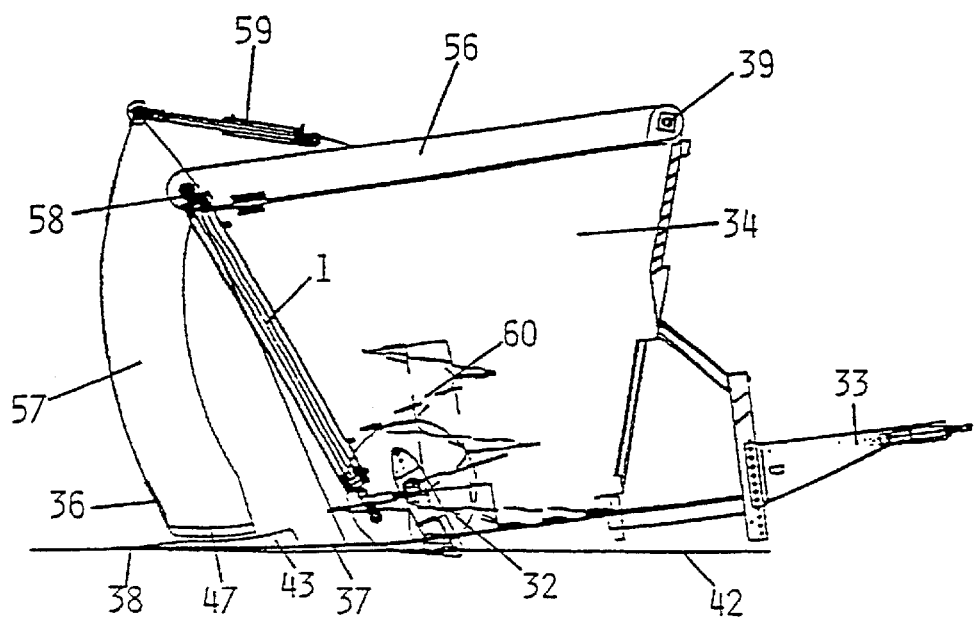
Figure 14:
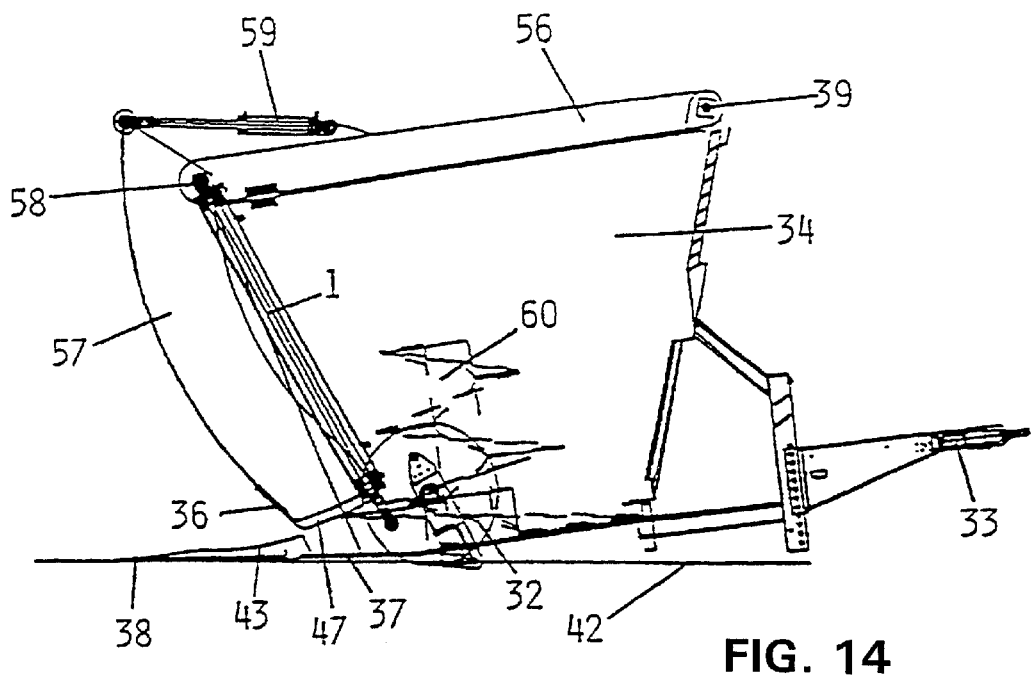

According to FIG. 11, the side wall 44 is provided with the stop 48 which cooperates with the guide mechanism 49 on the side wall 45. The side wall 45 of the first frame member 35 is slid along the outer side of the side wall 44 of the second frame member 37. The guide mechanism 49 guarantees that the side wall is guided as planned and that no transverse movements occur as well as guaranteeing that the motion will be limited as soon as the guide mechanism 49 strikes against the stop 48. Such a situation is shown in FIG. 11 as a cross-section in the intersecting plane XI—XI of FIG. 9. The stop 48 is adjusted such that it will already limit the motion before the cutting edge of the lateral knives 47 hits the bottom of the groove.

In a second embodiment according to FIGS. 12 to 15, the second frame member 37 with its gripping devices 38 is fixedly connected to the mixing chamber 34. The second frame member 37 forms an extension of the bottom of the mixing chamber 34. In this embodiment, the first frame member consists of a respective arm 45 and of a loading device 57 which is connected to said arm 56 and adapted to be pivoted about a hinge axle 58 and which is implemented in the form of a loading flap having secured thereto the knife 36 and the lateral knives 47. The lateral knives 47 have curved cutting edges and are positioned so the hinge axle 58 is located at the center of the curvature. The cutting device 43 of this embodiment is provided with a corresponding curvature (drawing cut).

The arms 56 are pivoted by means of the cylinders 1, 2 about the hinge axle 38 relative to the mixing chamber 34. The loading flap or loading device 57 is pivotable about a pivot axis 58 at the ends of each arm 56 by means of two cylinders 59. Where appropriate, only one cylinder 59 may be provided at a central location.

When silage is being cut out, the cylinders 59 are first adjusted to a specific length. The first frame member, which consists of the arms 56 and the loading flap 57, moves from the position shown in FIG. 12 to the position shown in FIG. 13. Following this, the loading device 57 is pivoted to the position show in FIG. 14 by means of the cylinders 59. In the course of this process, the cut-out silage is transferred to the mixing chamber 34 where it can be mixed with other components with the aid of a mixing device 60, the loading device 57 defining part of the side wall of the mixing chamber 34.

Figure 15:
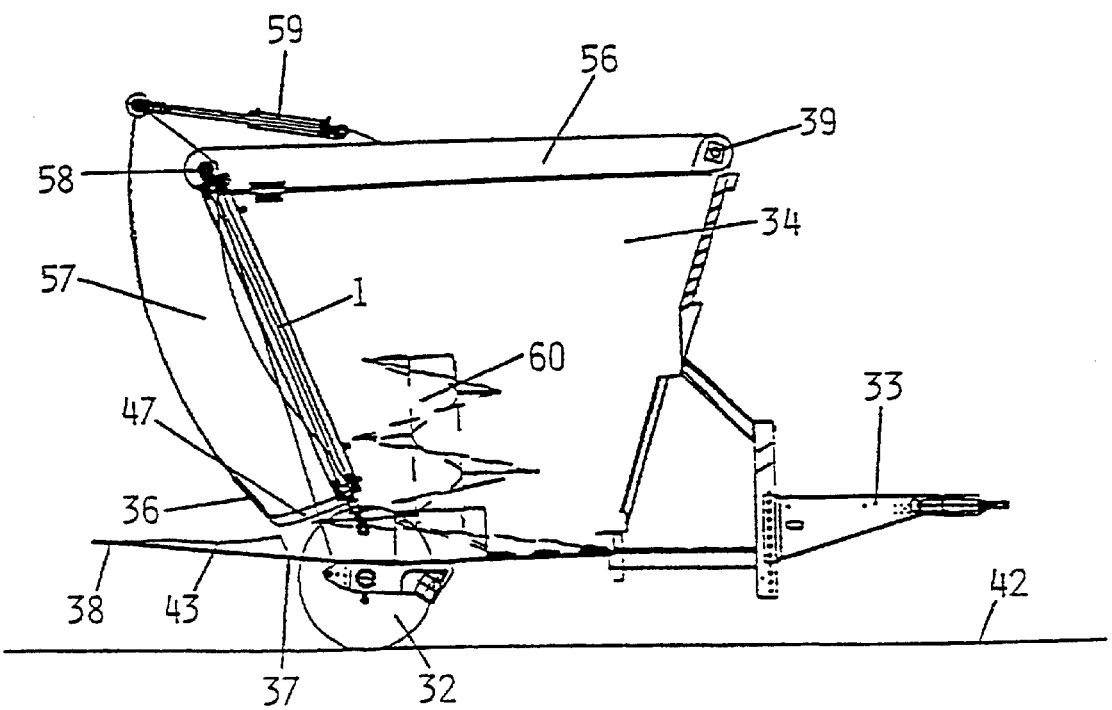

According to FIG. 15, the device can be raised in an approximately vertical direction by adjusting the ground support wheels 32. Thereafter, the device can be attached to a tractor and transported away.

Figure 16:
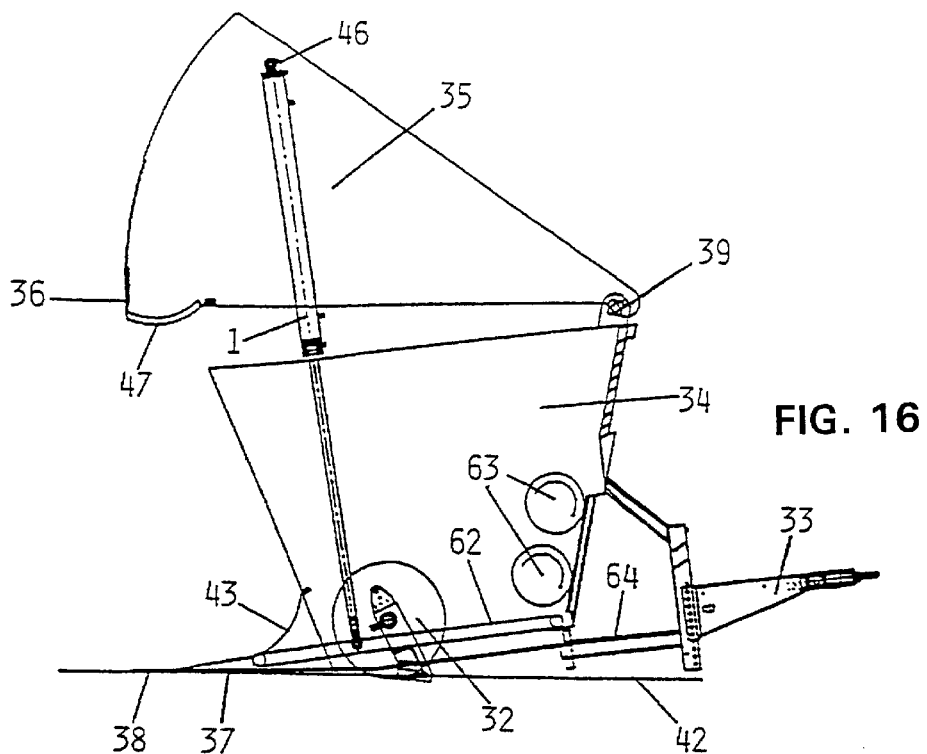
FIGS. 16–18 show a further embodiment of a silage cutter at a position at the end of a cutting operation, and at a transport position.
Figure 17:
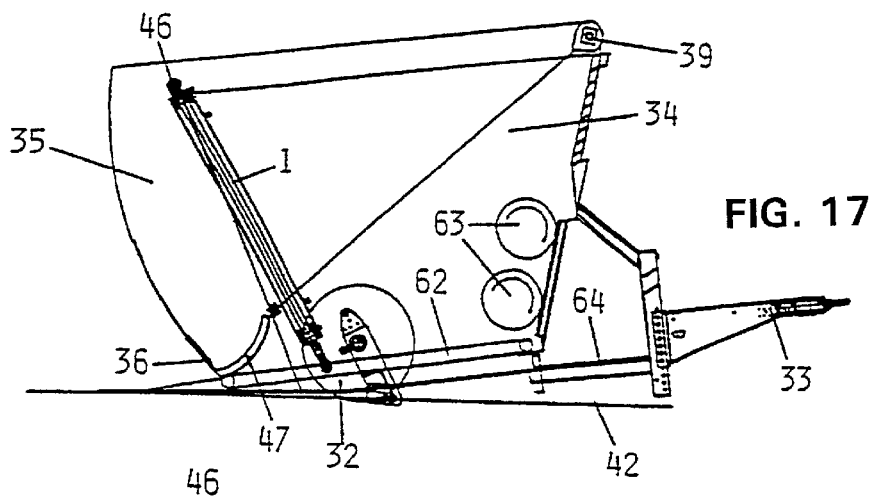
Figure 18:
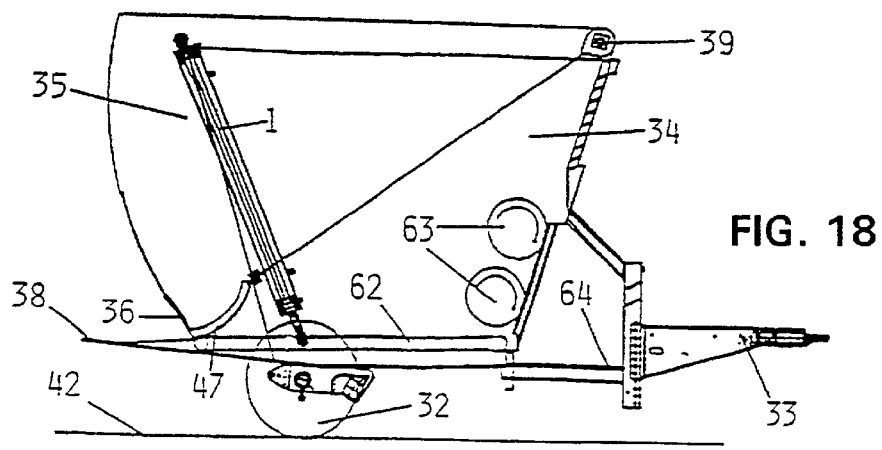

In the third embodiment of the silage cutter, illustrated in FIGS. 16 to 18, the second frame member 37, comprising the gripping devices 38 and the cutting device 43, is fixedly connected to the mixing chamber 34, in a manner corresponding to the attachment of these components outlined for the second embodiment. The first frame member 35 does not, however, consist of parts which are movable relative to one another, but the first frame member 35 can be pivoted in its entirety about the hinge axle 39 on the mixing chamber 34 by means of the cylinders 1, 2. As illustrated, the hinge axle 39 is located at the top of the mixing chamber 34.

In the mixing chamber 34, a conveying device 62 is provided on the bottom of the chamber. Deposited silage can be transported in the interior of said mixing chamber 34 forwards by means of said conveying device in the direction of two dosing rolls 63 which deposit dosed amounts of the silage on a conveyor belt 64 for transporting said silage out of the device in a lateral direction.

Figure 19:
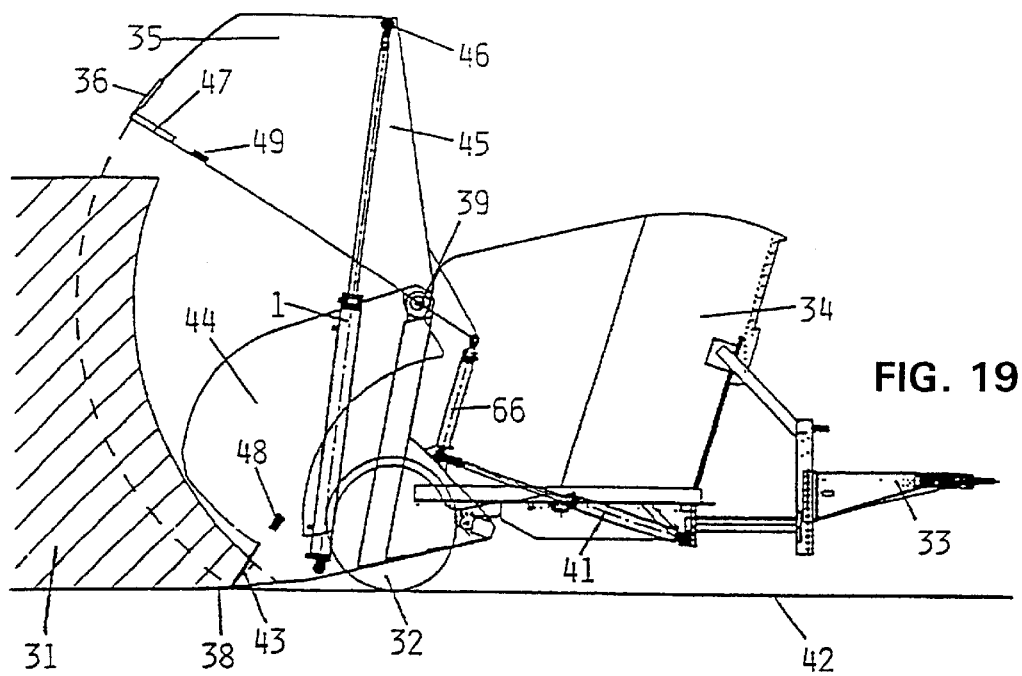
FIGS. 19–21 show a further embodiment of a silage cutter at a ready-to-cut position, at a position at the end of a cutting operation, and at a transport position.
Figure 20:
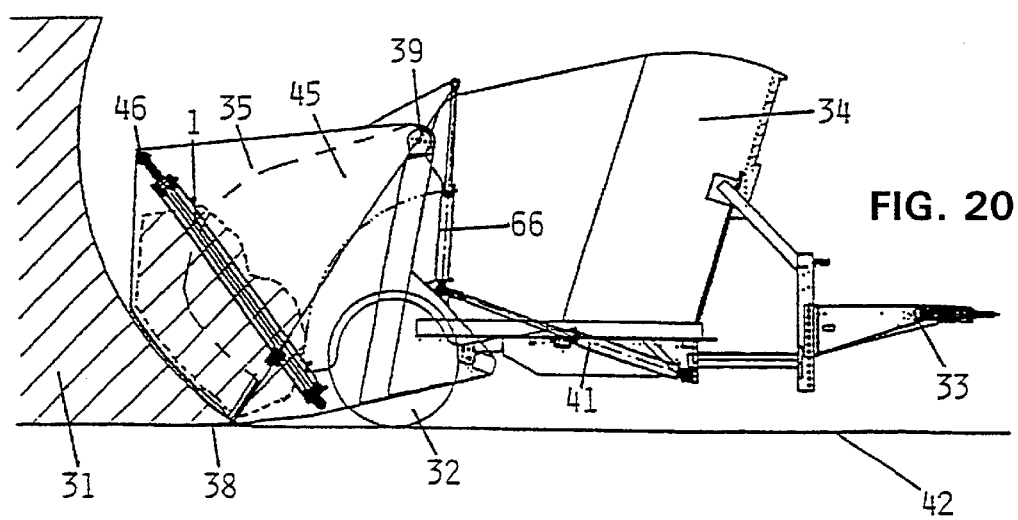
Figure 21:
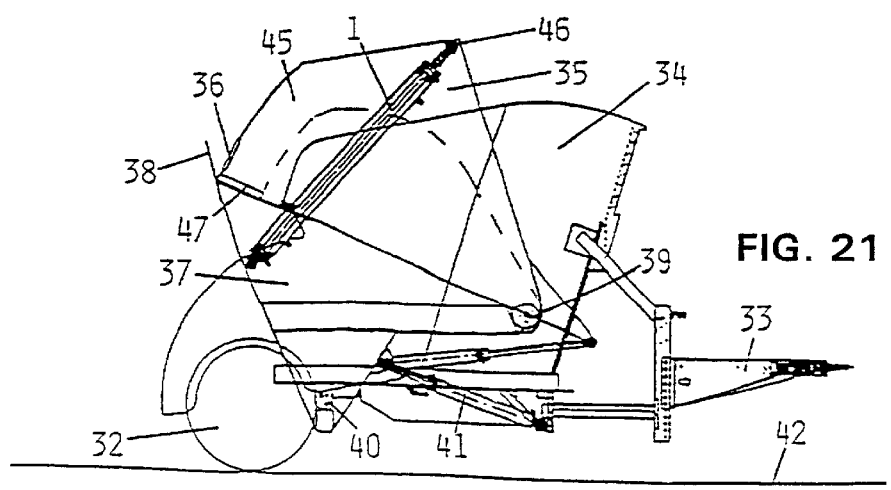

The fourth embodiment of the silage cutter illustrated in FIGS. 19 to 21, deviates from the first embodiment, since a respective hydraulic cylinder 66 is additionally provided on either side of the silage cutter. The first and second frame members 35 and 37 are moved towards each other by means of the cylinders 1, 2 in a scissorlike manner to cut the silage. The two cylinders 66 assist in this process with additional shearing forces to increase the cutting force. Each cylinder 66 acts on an extension of the first frame member 35 projecting beyond the hinge axle 39 on the side facing away from the knife 36. In spite of the higher cutting forces, a deformation of the frame is prevented by hydraulically guaranteeing that the lengths of the cylinders 1, 2 are always identical or rather that the cylinders adjusting movements are identical. The cutting force can substantially be increased by the cylinders 66 in this way, without any additional devices being required in addition to these cylinders 66. The cylinders 66 are simple hydraulic exerting approximately identical additional forces so that the dimensions of said cylinders 1, 2 need not exceed a certain limit.

Figure 22:
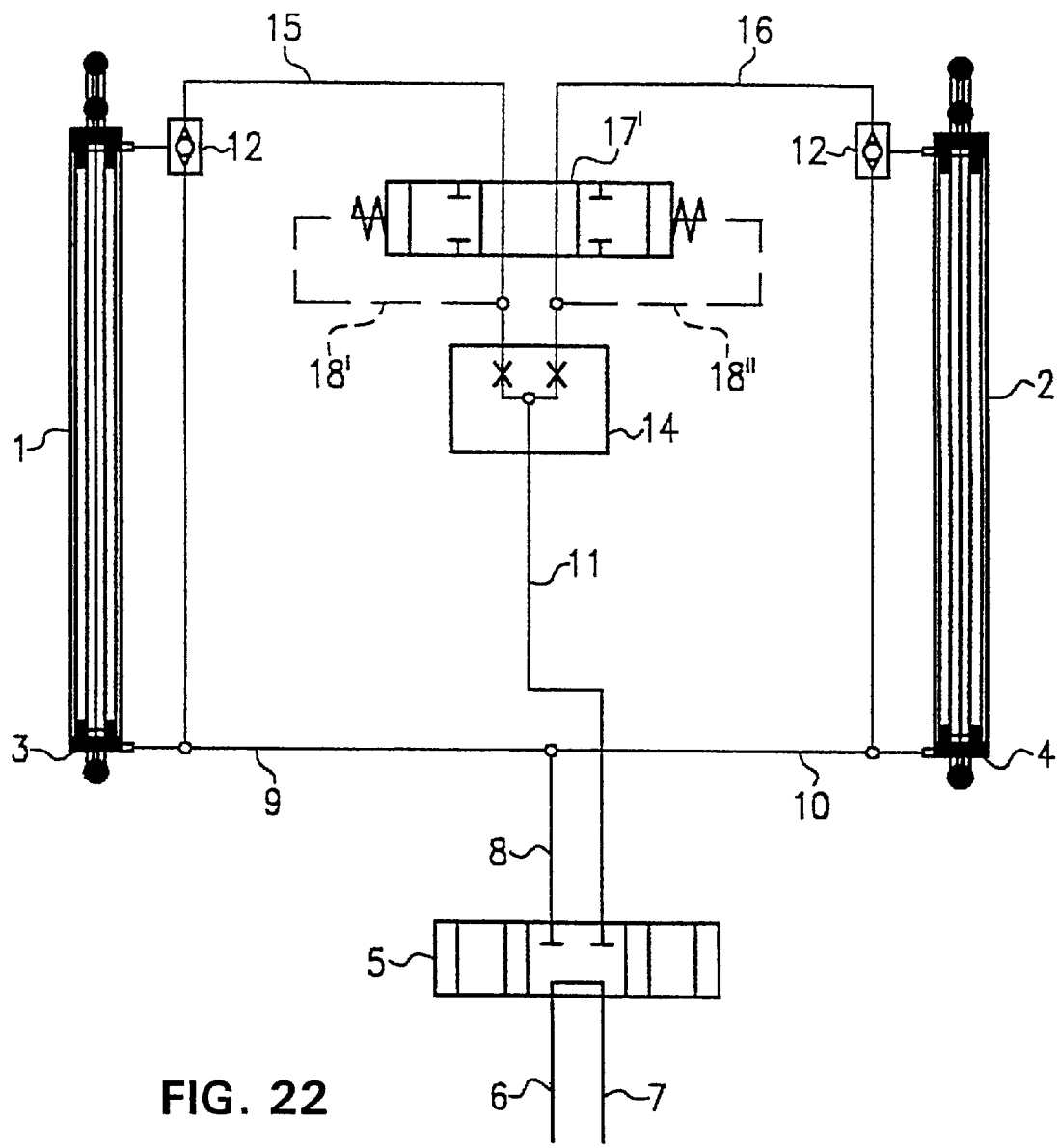
FIGS. 22–25 show further hydraulic schemes for drive mechanisms of a silage cutter according to the present invention, each at a pressureless neutral position.

In FIG. 22, the flow divider 14 in the operating conduits 15, 16 is followed by a compensating regulating or control valve 17, for instance, a 4/3-way control valve which has a spring-centered open neutral position and both sides of which valve are hydraulically actuated. The control connections of the valve 17 are connected to the operating conduits 15, 16 via pilot conduits 18, 18. If, for instance, during a silage cutting operation, cylinder 1 operates against a lower counter pressure than cylinder 2, the valve 17 will be moved to the left and the pressure medium flow in the operating conduit 15 will be throttled, if necessary, up to complete blockage. Cylinder 1 cannot, however, advance relative to cylinder 2.

Figure 23:
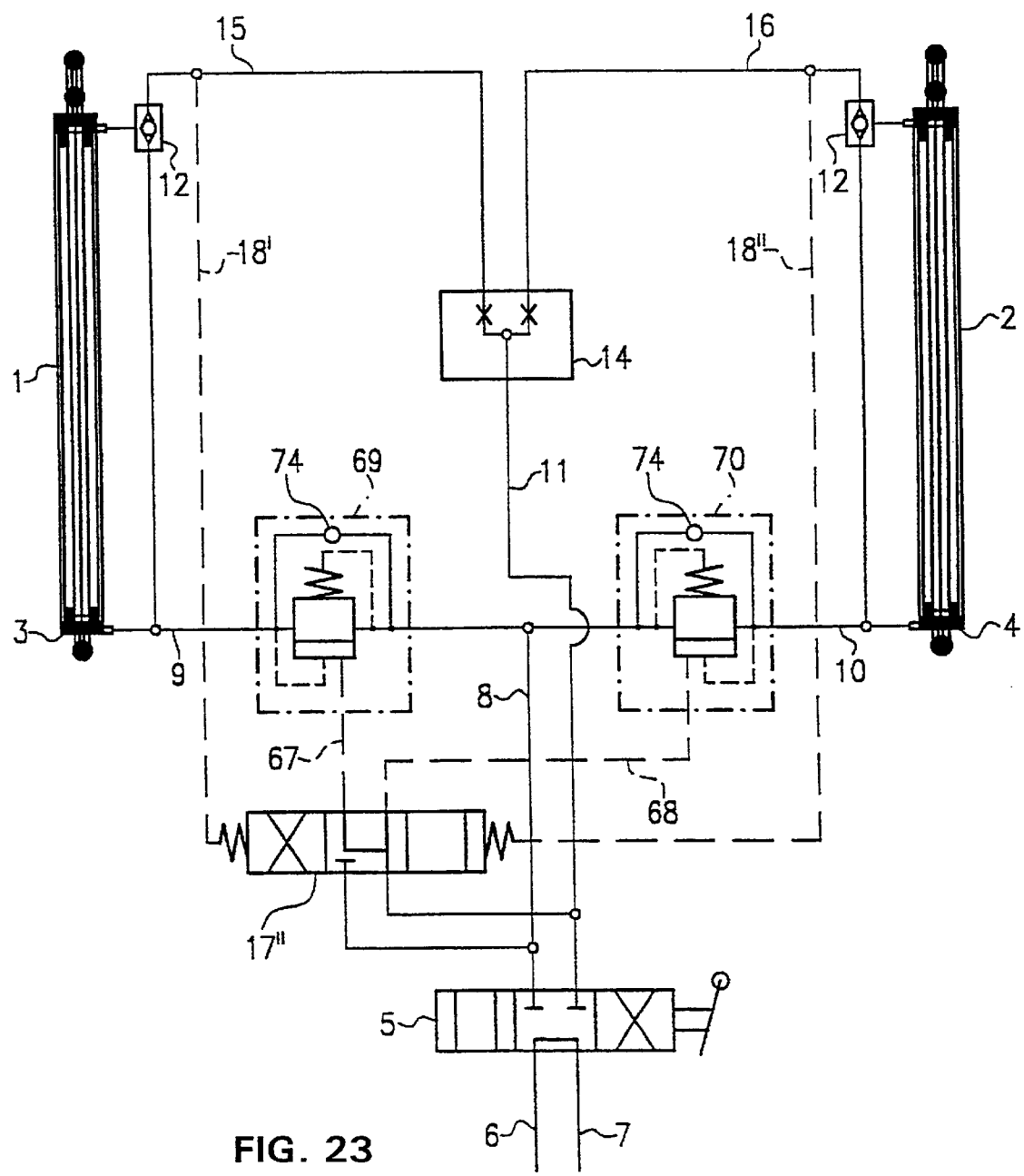

FIG. 23 shows a compensating control valve 17, e.g. a 4/3-way control valve with a spring-centered neutral position at which two control conduits 67, 68 are connected to one another and to a common pressure medium supply conduit 11, and with hydraulic opposite actuation from the pilot conduits 18, 18 of a pilot circuit branching off from the operating conduits 15, 16. During silage cutting, the second inlet of the valve 17 is open to the discharge conduit 8 leading to the directional control valve 5. The conduits 9, 10 have brake valves 69, 70 provided therein, e.g. pressure-limiting valves which are adapted to be unblocked against a spring force by control pressures derived from the respective cylinder and/or from the control conduits 67, 68. Each valve 69, 70 is bypassed by a check valve 74 in the bypass, said check valve 74 opening in the flow-in direction to the piston-side chambers of the cylinders 1, 2 (directional control valve 5 moved to the right). When the directional control valve 5 is moved to the left (cutting position), the two brake valves 69, 70 are kept open by pressure from the pressure medium supply conduit 11, the valve 17 is kept at the position shown and the control conduits 57, 68 are kept open, as long as no substantial pressure difference (corresponding e.g. to the force of the centering springs of the valve 17) occurs between the operating conduits 15, 16. None of the cylinders is decelerated on the discharge side. If the pressure in operating conduit 16 becomes higher than that in operating conduit 15, the compensation control valve 17 is moved to the left from the pilot conduit 18. The brake valve 70 is kept open via the control conduit 68 from the pressure medium supply line 11. The brake valve 69 is relieved to the discharge conduit 7 via the control conduit 67, the brake valve 69 being kept by its spring at a shut-off position or at a throttling position. The cylinder 1, which is just operating against a lower counter pressure, is decelerated on the discharge side and forced to move synchronously with cylinder 2, which is just operating against the higher counter pressure.

Figure 24:
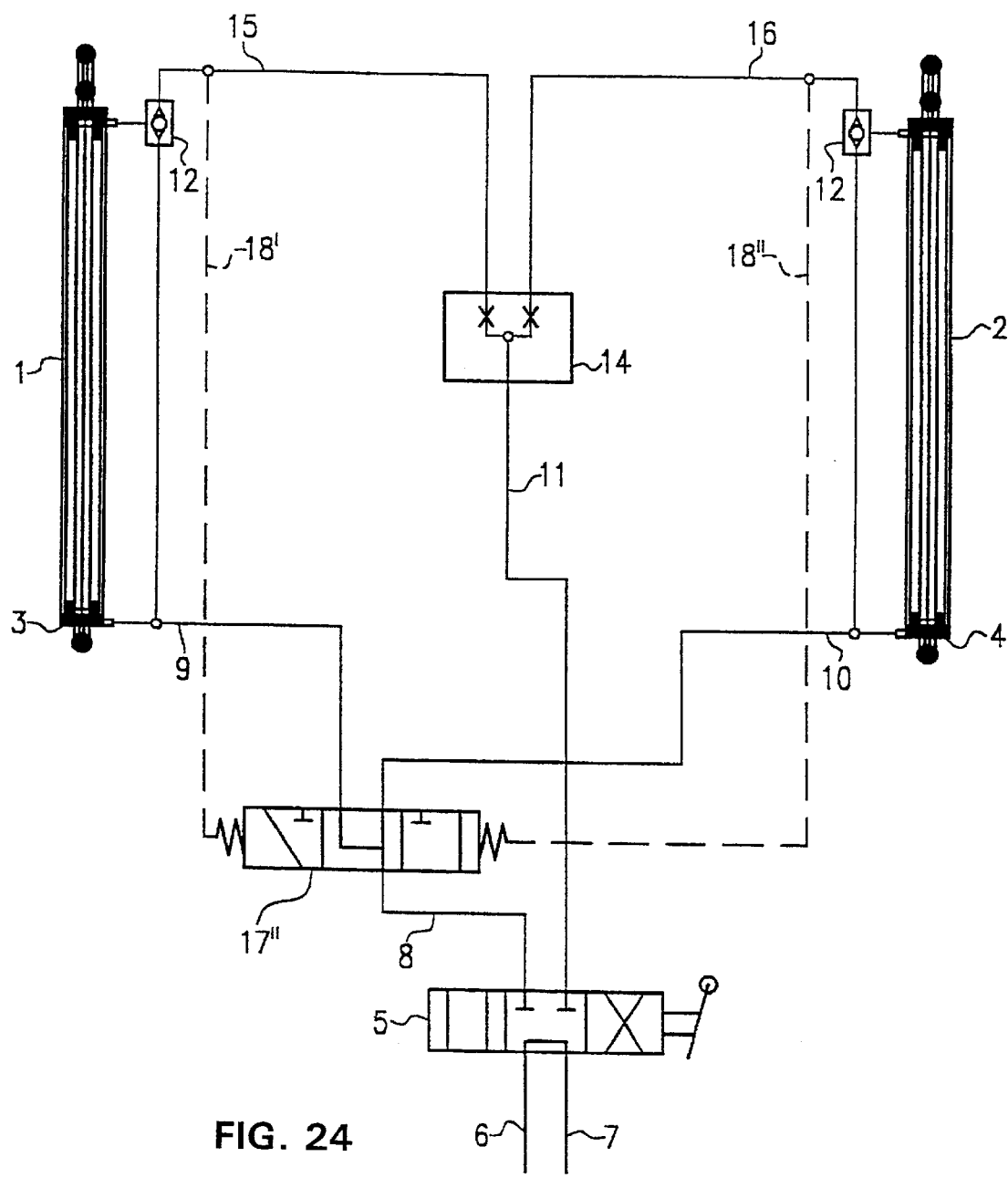

In FIG. 24, the compensation control valve is provided directly between the conduits 9, 10 and the discharge conduit 8 leading to the directional control valve 5, the compensating control valve being controlled from the pilot conduits 18, 18. As long as no substantial pressure difference occurs between the operating conduits 15, 16 downstream of the flow divider 14 during silage cutting, the valve 17 will not intervene. Only if a pressure difference of a predetermined magnitude occurs, the valve 17 will decelerate cylinder 1 or 2, which is just operating against the lower counter pressure, on the discharge side until the pressure difference between the operating conduits has been equalized.

Figure 25:
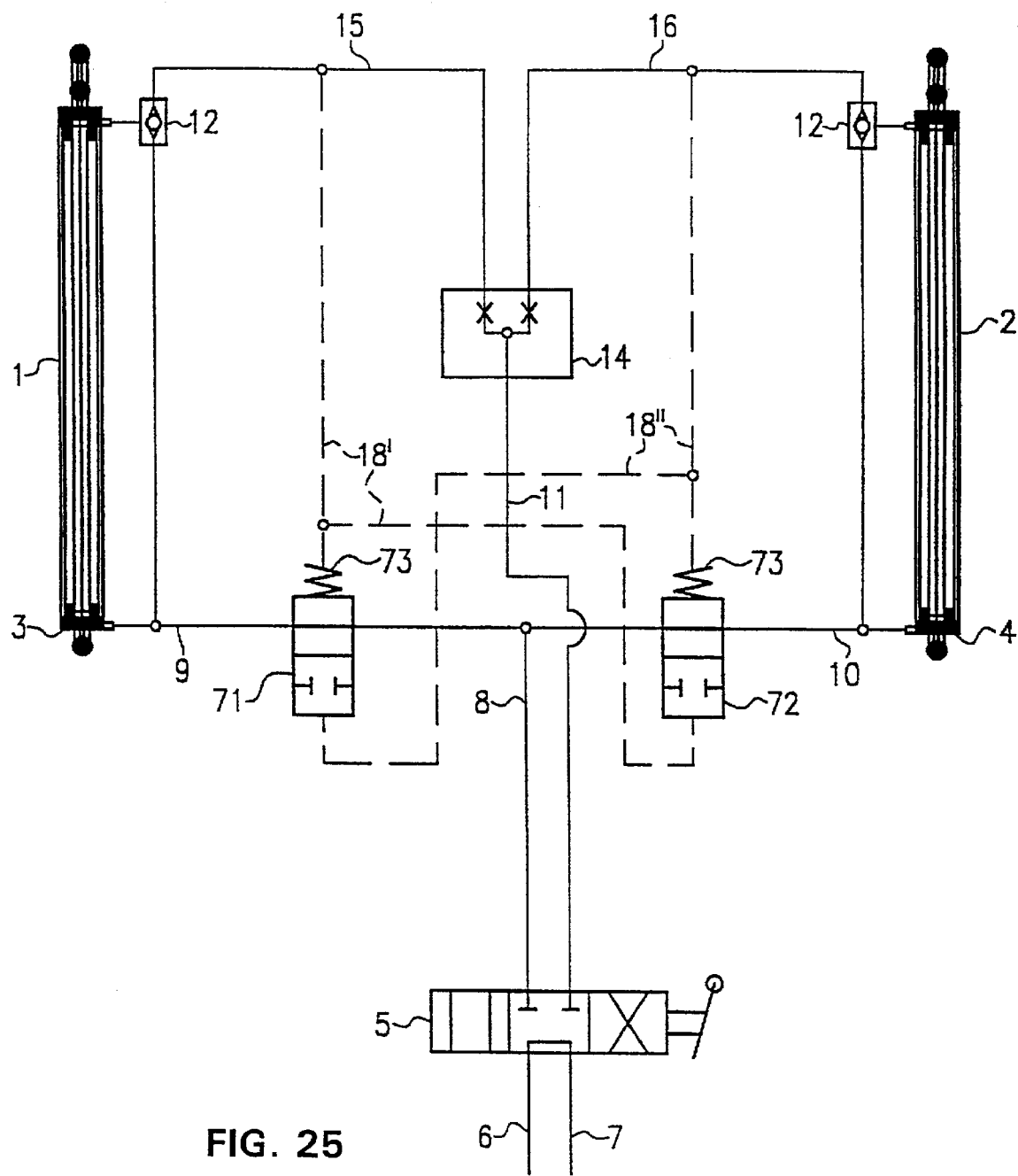

In FIG. 25, the conduits 9, 10 on the discharge side (during silage cutting) have arranged therein biased control valves 71, 72 which are controlled crosswise from the operating conduits 15, 16 via the pilot conduits 18, 18. At least during silage cutting, it can, however, be moved towards its blocking position from the respective other pilot conduit 18 or 18 when a certain pressure difference occurs between the operating conduits. The respective cylinder 1 or 2 operating against the lower counter pressure is then decelerated or biased on the discharge side until the pressure difference between the operating conduits have been equalized. Fundamentally, the flow divider 14 apportions to each cylinder the same amount of pressure medium per unit time independently of the counter pressure of each cylinder 1, 2 so that the cylinders move in synchronism. However, due to production and function tolerances, a tendency towards deviations may perhaps occur temporarily, said tendency towards deviations being compensated for by the additional control and regulating components according to FIGS. 22 to 25.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A silage cutter comprising:
   a frame including a first frame member having attached thereto a knife and a second frame member having at least one gripping device for gripping the silage, said first frame member being supported on said second frame member such that said first frame member is rotatable with respect to said second frame member about a hinge axle, a differential distance between said hinge axle and a portion of said at least one gripping device furthest from said hinge axle being greater than a distance between said hinge axle and said knife;
   at least one drive mechanism for moving said first and second frame members relative to one another, said drive mechanism including first and second hydraulic cylinders which are identically dimensioned and hydraulically connected to one another in parallel, each of said first and second hydraulic cylinders being articulated on said first and second frame members;
   a hydraulic device configured for adjusting said first and second hydraulic cylinders for synchronous movement and so that a length of said first hydraulic cylinder is equal to a length of said second hydraulic cylinder at least during cutting of the silage, said device including a hydraulic flow divider disposed to distribute identical pressure medium flows between a common pressure-medium supply conduit and first and second operating conduits which communicate with respective chambers of said first and second hydraulic cylinders so as to pressurize same in a cutting direction, a pressure-difference sensing valve in communication with said first and second operating conduits to detect a difference in hydraulic pressure between said first and second operating conduits, and an equalizing valve connected to said pressure-difference sensing valve and positioned between said pressure-medium supply conduit and a discharge conduit associated with said first and second hydraulic cylinders to equalize pressure in said first and second operating conduits in response to a pressure differential signal received from said pressure-difference sensing valve.

2. The silage cutter of claim 1 wherein said pressure-difference sensing valve and said equalizing valve are configured to limit a pressure difference between said first and second hydraulic cylinders to a set maximum value.

3. The silage cutter of claim 1 wherein a distance between said hinge axle and an articulation point of said first and second cylinders on said first frame member is greater than half a distance between said hinge axle and said knife.

4. The silage cutter of claim 3 wherein said distance between said hinge axle and said articulation point is greater than one of: two-thirds of said distance between said hinge axle and said knife; and three-fourths of said distance between said hinge axle and said knife.

5. The silage cutter of claim 1 wherein said first frame member includes at least one lateral knife having a convexly curved cutting surface and oriented at an approximate right angle with respect to said knife and generally radially relative to said hinge axle.

6. The silage cutter of claim 5 wherein said second frame member includes a cutting device configured for cooperation with at least one of said knife and said lateral knife, said cutting device including a groove configured to receive a cutting edge of said one knife.

7. The silage cutter of claim 5 wherein at least one of said knife and said lateral knife includes a plurality of downwardly extending portions which define a knurled or wavy cutting edge, and a distance between said downwardly extending portions of said cutting edge is less than about six centimeters.

8. The silage cutter of claim 1 wherein said differential distance ranges between at least about five centimeters and about fifteen centimeters.

9. The silage cutter of claim 1 wherein at least one of said first and second frame members is provided with a guide mechanism disposed to contact a stop provided on the other said frame member to limit movement of said one frame member relative to the other frame member, said guide mechanism being configured to transversely support said first and second frame members so as to prevent movement and deformation of said hinge axle.

10. The silage cutter of claim 1 further including a chamber structure for storing cut silage, said second frame member defining part of a wall of said chamber structure and being supported on said chamber structure by third and fourth hydraulic cylinders such that said second frame member is pivotable relative to said chamber structure, and conduits of said third and fourth cylinders include respective control valves for fixing an effective length of both of said third and fourth cylinders to temporarily fix said second frame member relative to said chamber structure.

11. The silage cutter of claim 1 further including a chamber structure for storing cut silage, said second frame member being fixedly connected to said chamber structure and having an extension which defines a bottom of said chamber structure, said first frame member including a plurality of arms each pivotable about said hinge axle relative to said chamber structure, and said knife is secured to a lower edge of a loading flap which is pivotably movable relative to said arms.

12. The silage cutter of claim 1 wherein a compensating control valve is positioned in said first and second operating conduits between said hydraulic flow divider and said chambers of said first and second hydraulic cylinders, said compensating control valve being a multi-position valve and having a neutral position to allow flow and at least one compensating position in which said compensating control valve throttles up to blockage the operating conduit having the lower pressure.

13. The silage cutter of claim 1 wherein a pilot circuit is connected in parallel to said first and second operating conduits and controls a compensating control valve arranged in pilot-control paths disposed between said pressure-medium supply conduit and a discharge conduit, and a brake valve is provided on a discharge side of each of said first and second hydraulic cylinders and is pilot controlled by a discharge pressure against a force of a spring, each of said brake valves decelerating the respective first and second hydraulic cylinder operating against a lower counter-pressure during silage cutting.

14. The silage cutter of claim 1 wherein a pilot circuit is connected in parallel to said first and second operating conduits and controls a compensating control valve arranged between conduits constituting discharge-side conduits in communication with the respective chambers of said first and second hydraulic cylinders during silage cutting and a common discharge conduit, said pilot circuit decelerating the respective first and second hydraulic cylinder operating against a lower counter-pressure in response to a pressure difference between said first and second operating conduits.

15. The silage cutter of claim 1 wherein a pilot circuit is connected in parallel to said first and second operating conduits and senses pressure differences between said first and second operating conduits, and discharge-side conduits in communication with the respective chambers of said first and second hydraulic cylinders during silage cutting are provided and lead to a common discharge conduit, each of said discharge conduits having arranged therein a biased control valve adapted to be displaced between a spring-biased open position and a blocking position and, during silage cutting, said biased control valve is pressurized parallel to said spring via said pilot circuit with a pilot pressure of the associated cylinder in the direction of the open position and with a pilot pressure of the other cylinder in the direction of the blocking position such that the respective cylinder operating against a lower counter pressure is decelerated on a discharge side thereof.

16. The silage cutter of claim 1 wherein said pressure-difference sensing valve is connected via a pilot conduit to a closing side of said equalizing valve, said equalizing valve being pilot-controlled from said pressure-medium supply conduit in the opening direction against a force of a spring.

17. A silage cutter comprising:
a frame including a first frame member having attached thereto a knife and a second frame member having at least one gripping device for gripping the silage, said first frame member being supported on said second frame member such that said first frame member is rotatable with respect to said second frame member about a hinge axle, a differential distance between said hinge axle and a portion of said at least one gripping device furthest from said hinge axle being greater than a distance between said hinge axle and said knife;
at least one drive mechanism for moving said first and second frame members relative to one another, said drive mechanism including first and second hydraulic cylinders each articulated on said first and second frame members, said first and second hydraulic cylinders being hydraulically connected in series such that hydraulic medium from said first hydraulic cylinder is conducted to said second hydraulic cylinder, each said first and second hydraulic cylinder having a piston-side chamber and a piston-rod-side chamber; and
a hydraulic device configured for adjusting said first and second hydraulic cylinders for synchronous movement and so that a length of said first hydraulic cylinder is equal to a length of said second hydraulic cylinder at least during cutting of said silage, an active cross-sectional surface on a piston-rod-side of one of said cylinders substantially corresponding to an active cross-sectional surface on a piston-side of the other cylinder to allow movement of said cylinders at the same speed.

18. The silage cutter of claim 17 further including first and second equalizing valves positioned between said first and second hydraulic cylinders such that said first equalizing valve controls said first hydraulic cylinder and said second equalizing valve controls said second hydraulic cylinder, said first and second equalizing valves acting as pilot-controlled pressure-limiting valves which have a maximum-pressure limiting function and are associated with a discharge conduit so as to maintain a force exerted on each of said cylinders under a predetermined value.

19. The silage cutter of claim 17 wherein a distance between said hinge axle and an articulation point of said first and second cylinders on said first frame member is greater than half a distance between said hinge axle and said knife.

20. The silage cutter of claim 19 wherein said distance between said hinge axle and said articulation point is greater than one of: two-thirds of said distance between said hinge axle and said knife; and three-fourths of said distance between said hinge axle and said knife.

21. The silage cutter of claim 17 wherein said first frame member includes at least one lateral knife having a convexly curved cutting surface and oriented at an approximate right angle with respect to said knife and generally radially relative to said hinge axle.

22. The silage cutter of claim 21 wherein said second frame member includes a cutting device configured for cooperation with at least one of said knife and said lateral knife, said cutting device including a groove configured to receive a cutting edge of said one knife.

23. The silage cutter of claim 21 wherein at least one of said knife and said lateral knife includes a plurality of downwardly extending portions which define a knurled or wavy cutting edge, and a distance between said downwardly extending portions of said cutting edge is less than about six centimeters.

24. The silage cutter of claim 17 wherein said differential distance ranges between at least about five centimeters and about fifteen centimeters.

25. The silage cutter of claim 17 wherein at least one of said first and second frame members is provided with a guide mechanism disposed to contact a stop provided on the other said frame member to limit movement of said one frame member relative to the other frame member, said guide mechanism being configured to transversely support said first and second frame members so as to prevent movement and deformation of said hinge axle.

26. The silage cutter of claim 17 further including a chamber structure for storing cut silage, said second frame member defining part of a wall of said chamber structure and being supported on said chamber structure by third and fourth hydraulic cylinders such that said second frame member is pivotable relative to said chamber structure, and conduits of said third and fourth cylinders include respective control valves for fixing an effective length of both of said third and fourth cylinders to temporarily fix said second frame member relative to said chamber structure.

27. The silage cutter of claim 17 further including a chamber structure for storing cut silage, said second frame member being fixedly connected to said chamber structure and having an extension which defines a bottom of said chamber structure, said first frame member including a plurality of arms each pivotable about said hinge axle relative to said chamber structure, and said knife is secured to a lower edge of a loading flap which is pivotably movable relative to said arms.

* * * * *